United States Patent [19]
Medebach et al.

[11] Patent Number: 5,746,094
[45] Date of Patent: May 5, 1998

[54] AUTOMATIC LENGTH-CORRECTING DEVICE FOR FLEXIBLE CABLE DRIVES IN PARTICULAR A CABLE-ADJUSTING DEVICE

[75] Inventors: Thomas Medebach, Wetzlar-Dudenhofen; Klaus Marscholl, Ehringshausen-Breitenbach, both of Germany

[73] Assignee: Kuster & Co., GmbH, Ehringshausen, Germany

[21] Appl. No.: 722,197

[22] PCT Filed: Feb. 13, 1996

[86] PCT No.: PCT/EP96/00596

§ 371 Date: Oct. 15, 1996

§ 102(e) Date: Oct. 15, 1996

[87] PCT Pub. No.: WO96/25604

PCT Pub. Date: Aug. 22, 1996

[30] Foreign Application Priority Data

Feb. 13, 1995 [DE] Germany .................. 195 04 497.5

[51] Int. Cl.⁶ ............................................. F16C 1/22
[52] U.S. Cl. .................................... 74/502.4; 74/501.5 R
[58] Field of Search .................... 74/501.5 R, 502.4, 74/502.6; 188/196 R, 198, 200

[56] References Cited

U.S. PATENT DOCUMENTS

| | | | |
|---|---|---|---|
| 4,751,851 | 6/1988 | Deligny et al. | 74/501.5 R |
| 4,854,185 | 8/1989 | Lichtenberg et al. | 74/501.5 R |
| 5,161,428 | 11/1992 | Petrucello | 74/501.5 R |
| 5,178,034 | 1/1993 | Reasoner | 74/501.5 R |
| 5,261,292 | 11/1993 | Gabas et al. | 74/501.5 R |
| 5,295,408 | 3/1994 | Nagle et al. | 74/501.5 R |
| 5,544,543 | 8/1996 | Hilgert et al. | 74/501.5 R |

FOREIGN PATENT DOCUMENTS

| | | |
|---|---|---|
| 342994 | 11/1989 | European Pat. Off. |
| 2626231 | 7/1989 | France |
| 2168123 | 6/1986 | United Kingdom |
| 86-05849 | 10/1986 | WIPO |
| 93-22571 | 11/1993 | WIPO |

Primary Examiner—Rodney H. Bonck
Assistant Examiner—Saúl J. Rodriguez
Attorney, Agent, or Firm—Longacre & White

[57] ABSTRACT

A device for the automatic length-correction of flexible cable drives, in particular a cable adjusting device (10) with a tube fitting (16), said tube fitting (16) comprising a seat (18) for a cable-drive tube and further a duct (46) for the cable proper of the cable drive. The outside wall in the region of the extension (20) is fitted with a radial toothing (22). An essentially bush-shaped casing (12) comprises a longitudinal borehole (14) inside which said extension (20) is displaceably guided in the longitudinal direction. At a rear segment (13) the casing (12) comprises a receiving recess (15) adjoining the front segment (11) with the longitudinal borehole (14) and receiving in displaceable manner within two limit positions a detent member (23) cooperating with the radial toothing (22) and able to move from a locked position into an unlocked position. A compression spring (34) is mounted between the casing (12) and the tube fitting (16) and may act on the tube fitting (16) to move it out of the casing (12) for the purpose of length correction.

9 Claims, 1 Drawing Sheet

5,746,094

AUTOMATIC LENGTH-CORRECTING DEVICE FOR FLEXIBLE CABLE DRIVES IN PARTICULAR A CABLE-ADJUSTING DEVICE

BACKGROUND OF THE INVENTION a) Field of the Invention

The invention concerns an automatic cable-length adjusting device for flexible cable drives or the like, in particular a cable-adjusting device, comprising a tube fitting with a seat receiving a tube of the drive cable and furthermore a duct for the cable proper located in the area of an integrated extension, the outer wall of said fitting comprising a radial toothing in the region of the said extension means. The device of this invention also comprises an essentially bush-shaped casing evincing a longitudinal borehole wherein the extension is guided in a longitudinally displaceable manner and also a detent means cooperating with said radial toothing.

b) Description of Related Art

Devices to correct the length of mechanically flexible, remote drives are known for instance from the patent document WO93/22571, in particular its FIG. 4 and the associated description. This length-correcting device is characterized in that it automatically carries out length-adjustment as soon as the required prestressing for instance of the tube of a mechanically flexible remote control means has vanished. Operationally this known device has been found quite satisfactory, however its design is fairly complex and the detent means is susceptible to soiling, and as a result device operation may be degraded. The need therefore exists for a device of the initially cited species that offers a simpler design and having operational reliability that is increased.

SUMMARY OF THE INVENTION

Essentially the invention solves the drawbacks in the prior art in that the casing comprises in a rear zone a receiving recess adjoining the front zone with the longitudinal borehole wherein the detent means is displaceably received between two limit positions and wherein it may be moved from a locked position into an unlocked position, a compression spring being mounted between the casing and the tube fitting, said spring moving the tube fitting out of the casing for the purpose of effecting length adjustment.

These design steps provide an exceedingly simple construction of length-correcting devices which on one hand thus are constituted only of a very few components and on the other hand protect the detent means against soiling within a receiving recess in the casing, thus opposing the danger of soiling and increasing operational reliability.

In one advantageous embodiment of the invention, the detent means is the bush enclosing the extension and comprises integral elastic arms fitted unilaterally with inward detent teeth. The bush-shaped detent means thereby is guided reliably and safely between the inside wall of the receiving recess of the casing and the outside wall of the extension of the tube fitting.

In another advantageous feature of the invention, the elastic arms evince at their ends an external bevel surface resting in the locked position of the detent means on a substantially conical support of the recess. As a result, length adjustment of the device is precluded when a detent means is in the locked position.

Advantageously the detent means comprises in one end zone a circumferential annular wall which may be fitted with slots and which on the inside is fitted with a step and/or on the outside is fitted with a run-up bevel. Whereas the inside step serves to receive a portion of the tube fitting in the telescoped position and hence makes the device more compact, the annular wall per se acts as a stop for the detent means present in the recess to limit the excursion. The run-up bevels facilitate the initial insertion of the detent means into the casing's receiving recess when the device of the invention is being installed.

To limit the detent means' excursion, the casing's receiving recess comprises a circumferential step at its rear to act as a stop for the detent means when it is in the unlocked position.

Advantageously an externally pointing collar is present at an end segment of the tube fitting, the compression spring being clamped between this collar and an annular support of the casing.

A circumferential, annular offset is formed in the transition region between the tube fitting and the extension and can be made to rest against the step of the detent means when the device of the invention is in its telescoped position.

In a further advantageous embodiment of the invention, the path length of detent-means' excursion between the two limit position is defined by a predetermined slack in the cable proper. Accordingly, a defined residual cable slack is assured in the drive system, and thereby stressing due to adjustment motions is precluded.

Further objects, advantages and features and applicabilities of the present invention are elucidated in the following description of an embodiment of the invention and in relation to the drawings. All described and/or graphically shown features per se or in arbitrary, meaningful combinations will be an object of the present invention, even independently of their combination in the claims or in the relations of claims to one another.

DETAILED DESCRIPTION OF PREFERRED EMBODIMENT

Figure 1:
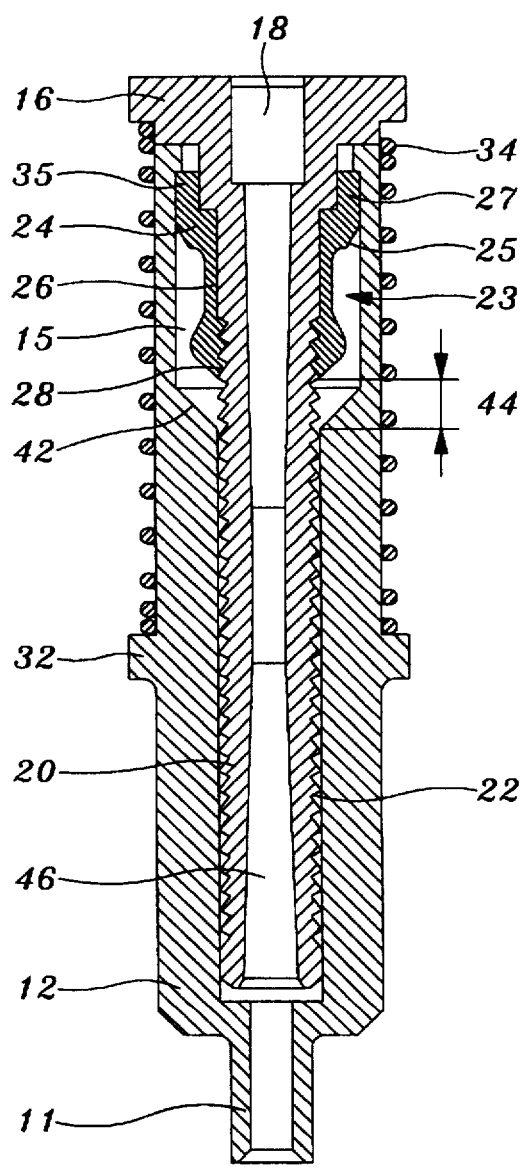
FIG. 1 is an illustrative embodiment of the cable adjusting device of the invention in sectional perspective, the detent means being in the unlocked position.

The cable adjusting device 10 shown in FIG. 1 for flexible drive cables or the like comprises a tube fitting 16. The tube fitting 16 comprises a seat 18 for a tube of the drive cable and furthermore, in the region of an integral extension 20, it evinces a duct 46 passing the cable proper. Preferably the duct 46 flares conically at the end of the extension 20. The outside wall of the extension 20 is fitted at least in some zones with a radial toothing 22.

Figure 2:
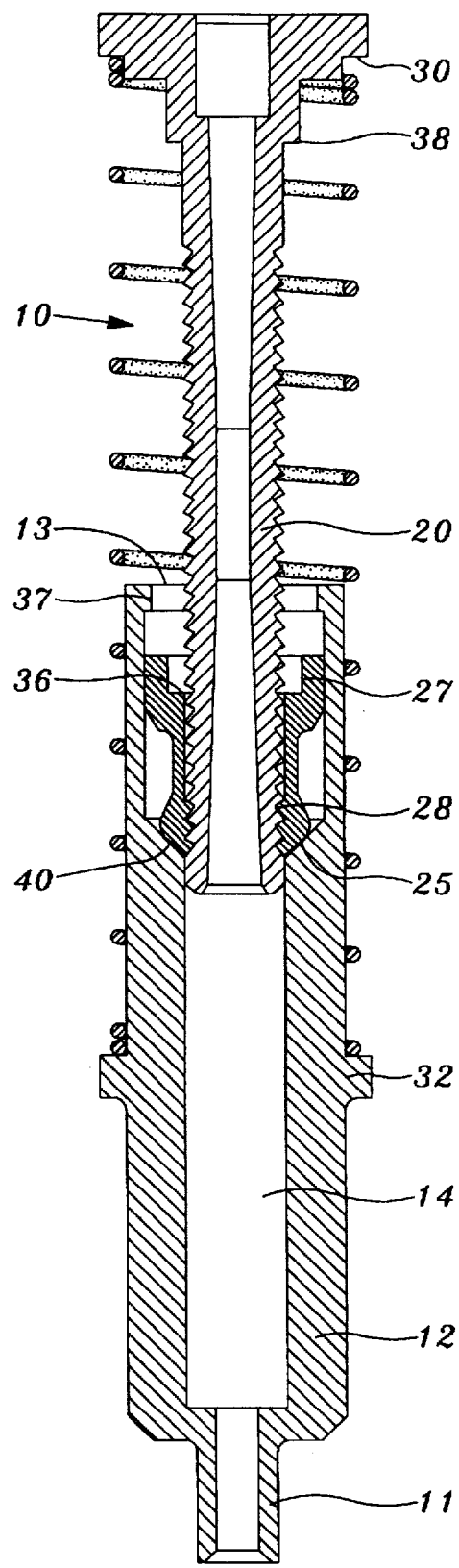
FIG. 2 is the cable adjusting device of FIG. 1 in the spring-driven position with the detent means in its locked position.

An essentially bush-shaped casing 12 which may be affixed illustratively rigidly to the output of a cable-drum of cable window lift but which also may be affixed to a brake or clutch cable is fitted with a longitudinal borehole 14 inside which the extension 20 is guide in longitudinally displaceable manner. In a rear zone 13, the casing 12 comprises a receiving recess 15 adjoining the front segment 11 with the longitudinal borehole 14. A detent means 23 cooperating with the radial toothing 22 of the extension 20 is displaceably received in the receiving recess 15 between the two limit positions. The right limit position shown in FIG. 1 corresponds to the unlocked position, the detent means 23 shown in the left limit position in FIG. 2 being in the locked position.

A compression spring 34 is mounted between the casing 12 and the tube fitting 16 and allows driving the tube fitting 16 of the casing 12 for the purpose of length adjustment.

The detent means 23 is designed as a bush 24 enclosing the extension 20 and comprises integral arms 26 which are fitted at their ends with inside detent teeth 28. At their ends the spring arms 26 evince external bevels 40 which, in the locked position of the detent means 23, rest on an essentially conical support 42 of the receiving recess 15 of the casing 12.

The detent means 23 comprises a circumferential annular wall 27, which where called-for is fitted with slots, in an end segment 35, said annular wall 27 being fitted inward with a step 36 and externally with a run-up bevel 25.

In the region of the rear segment 13 of the casing 12, the receiving recess 15 is bounded by a circumferential step 37 acting as a stop for the detent means 23 when in its unlocked position. In the central zone of the casing 12, there is an externally annular support 32 for the compression spring 34. Furthermore the compression spring 34 rests against a terminal collar of the tube fitting 16. A circumferential and external offset 38 is formed in a transition region between the tube fitting 16 and the extension 20 and can be placed against the step 36 of the detent means 23. The length of the excursion path 44 of the detent means 23 between the two limit positions is used to set a predetermined slack of the cable proper in the cable drive.

The cable adjusting device 10 operates as follows:

If slack arises in the cable proper of the cable drive and accordingly the tube enclosing the cable proper of the cable drive must be lengthened, the tube fitting 16 must be displaced out of the casing 12, in other words an elongation of the cable adjusting device 10 is required to achieve length correction. This displacement of the tube fitting 16 out of the casing 12 is implemented by the compression spring 34 present between the two components. During the displacement of the tube fitting 16 out of the casing 12, the detent means 23 initially is carried along by the radial toothing 22 engaging the tube fitting 16 until the end segment 35 of the annular wall 27 of the detent means 23 hits a step 37 bounding the receiving recess 15 of the casing 12. If the tube fitting 16 stressed by the compression spring 34 can be displaced farther than this path 44 out of the casing 12, then the arms 26 of the detent means 23 will be spread apart, whereby the radial toothing 22 of the extension 20 slips past under the detent teeth 28 of the detent means 23.

If now a force in the direction of front segment 11 of the casing 12 is applied on the cable proper of the cable drive, the spring force of the compression spring 34 will be overcome and as a result the tube fitting 16 together with the integral extension 20 as well as with the detent means 23 mounted on the extension 20 will be displaced in the receiving recess 15 of the casing 12 toward the conical support 40. At the end of the excursion path 44 the bevels 42 of the spring arms 26 of the detent means 23 will rest on the conical support 40 of the receiving recess 15, whereupon the detent means 23 shall be in the locked position.

Only thereupon shall the force further exerted on the cable proper be converted into a displacement of the cable proper inside the tube of the cable drive and only then shall the required compression between casing 12, detent means 23 and tube fitting 16 be effective as a counter-force to the tension of the cable proper. In other words, a defined slack of the cable proper in the cable drive shall remain over the excursion path 44 of the detent means 23 in the receiving recess 15, whereby stressing by adjusting displacements is precluded.

While the foregoing invention has been shown and described with reference to the preferred embodiment, it will be understood by those possessing skill in the art that various changes in form and detail may be made without departing from the spirit and scope of the invention.

We claim:

1. An automatic length-correcting device for a flexible cable drive, said device comprising:
    an essentially bush-like casing (12) with a longitudinal borehole (14),
    a tube fitting (16) having a seat for engaging the bush-like casing and a duct (46) in the region of an integral extension (20) for receiving a cable of the cable drive, an outside wall of said integral extension being fitted with a radial toothing (22), wherein the extension (20) is guided in a longitudinally displaceable manner in said longitudinal borehole,
    a compression spring (34) being mounted between the casing (12) and the tube fitting (16) to act on the tube fitting (16) to longitudinally displace said tube fitting out of the casing (12), and
    a detent means (23) cooperating with said radial toothing (22),
    wherein the casing (12) comprises at a rear segment (13) a receiving recess (15), the detent means (23) being entirely disposed within said receiving recess (15) and displaceable between two limit positions from a locked position into an unlocked position, said detent means (23) cooperating with said radial toothing (22) within said receiving recess.

2. Device defined in claim 1, the detent means (23) is designed to be a bush enclosing the extension (20) and comprising integral elastic arms (26) which at their ends are fitted with inside detent teeth (28).

3. Device defined in claim 2, an end portion of the elastic arms (26) evince an external bevel (42) which in the locked position of the detent means (23) rest against an essentially conical support (40) of the retaining recess (15).

4. Device defined in claim 1, wherein the detent means (23) evinces a circumferential annular wall, said annular wall (27) being fitted with at least one of an inside step (36) and an outside run-up surface (25).

5. Device defined in claim 1, wherein the receiving recess (15) is bounded in the region of the rear segment (13) of the casing (12) by a circumferential step (37) acting as a stop for the detent means (23) in its unlocked position.

6. Device defined in claim 1, wherein the compression spring (34) is clamped between a collar (30) of the tube fitting (16) and an annular support (32) of the casing (12).

7. Device defined in claim 1, wherein an external, circumferential offset (38) is present in transition region between the tube fitting (16) and the extension (20), said offset being adapted to rest against a step (36) of the detent means (23).

8. Device defined in claim 1, wherein a length of a path (44) between the two limit positions of the detent means (23) is defined by adjusting a predetermined slack of the cable.

9. An automatic length-correcting device for a flexible cable drive, said device comprising:
- an essentially bush-like casing (12) with a longitudinal borehole (14), a rear segment (13), and a rear end adjacent said rear segment;
- a tube fitting (16) having a seat for engaging the rear end of the bush-like casing and a duct (46) in the region of an integral extension (20) to receive a cable of the cable drive, an outside wall of said integral extension being fitted with a radial toothing (22), wherein the extension (20) is guided in a longitudinally displaceable manner in said longitudinal borehole (14) to allow said seat to engage said rear end of said bush-like casing (12);
- a compression spring (34) disposed about said casing (12) and seated against an external annular support of said casing and a terminal collar (30) of the tube fitting (16) to act on the tube fitting (16) to longitudinally displace said tube fitting out of the casing (12); and
- a detent means (23) disposed about and cooperatively engaging said radial toothing (22) of said tube fitting (16);

wherein the rear segment (13) of said bush-like casing defines a receiving recess (15) between a conical support (40) and a circumferential step (37) adjacent said rear end, the detent means (23) being received in said receiving recess (15) between said conical support (40) and said circumferential step (37) for limited displacement therebetween, said conical support (40) being a transition from said receiving recess and said longitudinal borehole (14) and acting as a stop to prevent displacement of said detent means when said device is in a locked position.

* * * * *